Dec. 26, 1939.   O. JABELMANN ET AL   2,184,925
CUP FOR CONTAINING LUBRICANT
Filed May 23, 1938
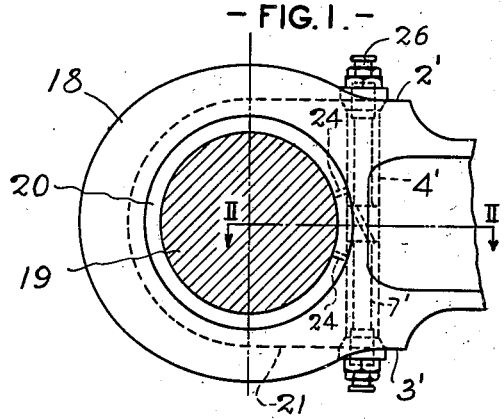
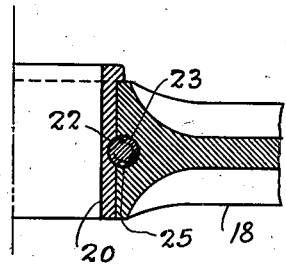
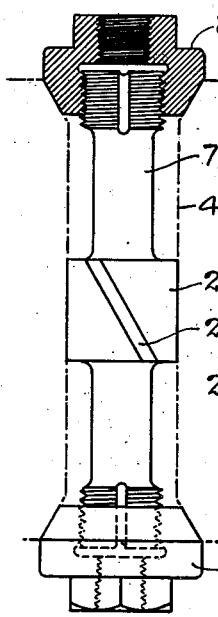
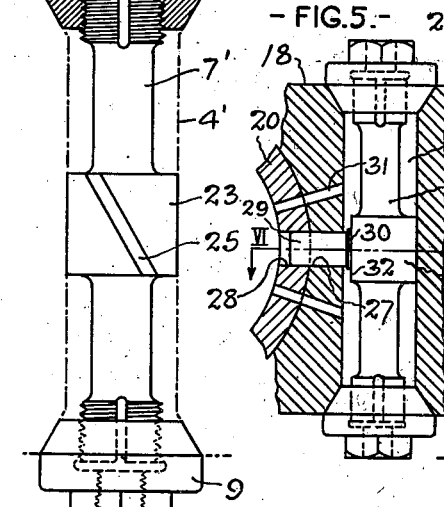
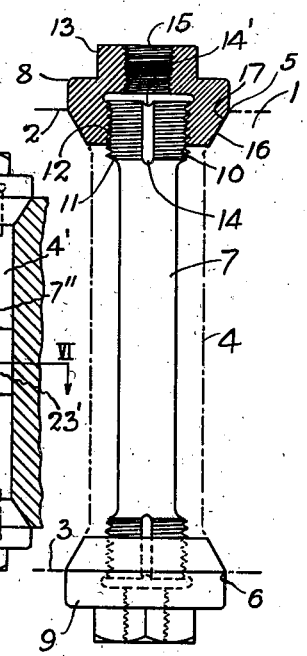
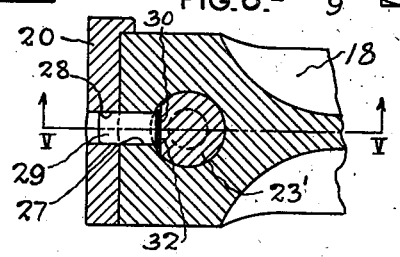
INVENTORS
Otto Jabelmann
Raymond J. Finch
BY S. C. Yeaton
ATTORNEY Patented Dec. 26, 1939

2,184,925

UNITED STATES PATENT OFFICE 2,184,925

CUP FOR CONTAINING LUBRICANT

Otto Jabelmann, Omaha, Nebr., and Raymond J. Finch, Schenectady, N. Y., assignors to American Locomotive Company, New York, N. Y., a corporation of New York Application May 23, 1938, Serial No. 209,512

10 Claims. (Cl. 308—121)

This invention relates to cups for containing lubricant for lubricating wearing faces of relatively movable parts of mechanisms, of the type comprising a threadless chamber open at both ends, and has for its object to provide a single closure device for closing both ends of the chamber.

Referring to the drawing forming part of this specification, Figure 1 is a front elevation, partly in section, of a portion of a power transmission rod mechanism including a bushing, showing a form of the invention involving a bushing lock; Fig. 2 is a section, on the line II—II of Fig. 1, the crank pin not being shown; Fig. 3 is an elevation, partly in section, of the closure device, a portion of the rod being indicated in dot and dash lines; Fig. 4 is a view, similar to Fig. 3, showing the device constructed without the bushing lock; Fig. 5 is a portion of a power transmission rod mechanism showing the invention involving a different type of bushing lock, the view being a section taken on the line V—V of Fig. 6, the lock and device being shown in elevation; and Fig. 6 is a section on the line VI—VI of Fig. 5, the lock being shown in plan.

The cup of the present invention is for use in supplying lubricant to the engaging bearing faces of two relatively movable members, as for example the engaging faces of a journal and a bearing therefor. The cup comprises a chamber for containing lubricant which ordinarily will be formed in one of the members adjacent to and communicating with the engaging faces, whereby the lubricant is permitted to escape from the cup to the faces. The chamber is open at both ends and is ordinarily formed in the member between opposite walls thereof by boring the member through from wall to wall thereby providing a chamber circular in cross section although this is not essential to the invention.

Referring to Fig. 4, the member 1 containing the chamber is shown fragmentally in dot and dash lines. The member comprises opposite walls 2 and 3, and is bored out between these walls to provide the cylindrical threadless bore or chamber 4 for containing the lubricant open at its opposite ends 5 and 6. In this Fig. 4, for convenience, the construction of the member is only shown sufficiently to indicate how the closure device is connected therewith.

The closure device comprises a body 7 and two heads 8 and 9. The body, at its end portion 10, is provided with threads 11 and the head 8, at its inner face, is hollow, and provided with threads 12 engaging the threads 11. The outer end of the head 8 is suitably faced as at 13 for the application of a wrench.

The head 9 may be formed integral with the body 7 or otherwise as desired, but in the preferred embodiment, as shown in Fig. 4, the head 9 and the body portion adjacent thereto are constructed similar to the head 8 and body portion adjacent thereto, and no further description of this construction is deemed necessary. The body 7 is of rod construction with a cross section less than that of the chamber, to provide sufficient space for the lubricant, and the portion between the threaded ends is preferably reduced in diameter, as shown, to increase this space.

The cup is provided with a passageway for communicating the chamber 4 with the exterior for filling the chamber with the lubricant, and this passageway may be formed in the member 1 or in either end of the closure device. In the present instance it is formed by providing a groove 14 extending from a groove 14' in the end of the body 7, adjacent the head 8, to the chamber 4 and a threaded orifice 15 formed in the head 8 disposed to bring the exterior into communication with the groove 14. The orifice 15 is provided with a closure (not shown in Fig. 4 but shown in Fig. 1) threaded to engage the threads of the orifice 15. The head 9 and body portion adjacent thereto are preferably provided respectively with a similar orifice and grooves, and no further description is deemed necessary.

Where the walls 2 and 3 are flat the heads or either of them may overlie these flat walls similar to an ordinary bolt head or bolt nut, but for reasons that will presently appear it is preferable to provide the construction shown in Fig. 4. Here the wall of the chamber 4 adjacent the wall 2 is countersunk, providing a frusto-conical-like face 16, and the head 8 is extended into the chamber and provided with a correspondingly shaped face 17 engaging the face 16. The head 9 is preferably similarly formed with a frusto-conical-like face, as is also the chamber 4 adjacent thereto. A device is thus provided having similar heads and similar body end portions, the frusto-conical-like faces of the chamber being likewise similarly formed.

Figs. 1 and 2 show the device used with a power transmission rod of a locomotive, a device being shown of a slightly different construction, Fig. 3 showing such device enlarged. In this exemplification of the invention the member with which the device is associated is the power transmission rod 18 and the other member with which it has relative movement is the crank pin 19 of a drive wheel (not shown). The member 18 is associated with a bearing element, in the particular instance a bushing or sleeve 20. The rod 18 is provided with oppositely disposed flat walls 2' and 3' which are provided by channelling the end of the rod to provide a channel, the end portions of the base 21 of which forming the walls 2' and 3'. The rod 18 is provided with a bore forming the chamber 4' extending from the wall 2' to the wall 3'.

A locomotive transmission rod is usually necessarily limited as to thickness on account of the permissible available space, and therefore to economize in cross-sectional dimension of the heads of the device, and to provide sufficient stock for the heads, without unduly increasing the length of the device, the heads are preferably countersunk in a manner already described instead of being extended to override and seat upon the flat walls 2' and 3'. Furthermore by providing the frusto-conical-like engaging faces at both ends of the cup the heads may be easily drawn to their seats with sealtight fits, and at the same time the closure device is centered relative to the chamber.

Where a bearing element, such, for example, as the bushing 20, is employed, the closure device may also be employed for securing the element in place. Various constructions of locking or securing devices may be devised for accomplishing this, which are in the contemplation of the present invention. A preferred construction is shown in Figs. 1 to 3. Here the chamber 4' is spaced at a distance from the center of the bushing 20 so that the cylindrical chamber 4' will extend through an adjacent circumferential portion of the bushing, thereby forming a groove 22 therein straight at its base and arcuate in cross section.

In the type of device here shown the body 7' is provided with a lateral extension, shaped complementary to the groove 22 to provide a tongue for engaging the groove, thereby serving as a lock preventing the bushing from rotating or moving laterally relative to the rod. In the present instance this extension is shown in the form of an integrally formed cylindrical collar 23 positioned on the body 7' to disposed it opposite the groove 22 when assembled. Such a construction provides that some portion of the collar fit within the groove to form the tongue-like lock, regardless of the angular position which the body 7' may assume when assembling the device with the chamber.

The device comprising the locking means may be similar to the construction heretofore described except as to the tongue and groove feature, and except as to the tongue and groove feature the device of Fig. 3 in the present instance is similar in all respects to the device of Fig. 4.

In any instance, in assembling the device the body thereof is placed within the chamber and if the head 9 is formed integral with the body it will obviously assume the position shown in Figs. 3 and 4. If it is made detachable, as there shown, it will preferably first be screwed upon the body in substantially the position it will assume, and then the body placed within the chamber, and when the construction is of the type shown in Fig. 3 the collar 23 will be disposed so that a portion thereof will engage the groove of the bushing, as shown in Fig. 1. The opposite head 8 is then screwed upon the body and tightened to draw both heads snugly into engagement at their frusto-conical-like faces with the frusto-conical-like faces of the chamber.

By making the ends of the device similar in all respects provides interchangeability of the heads, thereby effecting an economy.

As already stated, provision must be made to bring the chamber into communication with the bearing faces of the pin and bushing. To this end an orifice 24, serving as a lubricant conveying passageway, is formed in the bushing connecting the chamber with the bearing faces, and more than one of these may be formed if it is desired.

Where, as in the present instance, in Figs. 1 to 3, a collar 23 is employed as a locking element and it is desired that the portions of the chamber each side of the collar serve as lubricant containing portions, a passageway is provided spanning the collar and connecting the two portions of the chamber so that the lubricant may be permitted to freely pass from one portion of the chamber to the other, in which case the lubricant may be supplied to the device from but one end if desired. In the present instance this passageway is provided by forming a groove 25 in the collar extending from end to end thereof, bringing both of the chamber portions into communication, and the orifices 24 are disposed one or more at each side of the collar so that the lubricant in each portion of the chamber may be fed to the bearing faces.

The lubricant is supplied to the chamber through either one or both of the threaded orifices or passageways 15 and threaded plugs are provided for closing these orifices. In modern practice where grease is commonly employed as the lubricant, one or both of the plugs may be in the form of one of the commonly used grease fittings which allow grease to be introduced through the fitting, under pressure, and accordingly in Fig. 1 fittings 26 of usual construction are screwed into the orifices 15 at each end of the device.

Figs. 5 and 6 show a different type of bushing lock. Here the rod 18 and bushing 20 are provided with aligned orifices 27 and 28 and a pin 29 provided with a head 30 is disposed in these orifices, the end of the pin being spaced somewhat from the bearing face of the bushing. One or more orifices 31 extends through the bushing and rod for emitting fluid from the chamber 4' to the bearing face of the bushing. The pin 29 is applied by inserting it in the orifices 27 and 28 through the chamber 4' and a suitable tool (not shown) is employed for forcing the pin by a wedge or tight fit into the orifices with the head 30 somewhat spaced from the adjacent portion of the wall of the chamber 4'. The body of the device engages the head 30 to prevent it backing out of its retaining orifices when the rod is in service. In the preferred embodiment this is accomplished by providing a collar 23' similar to the collar 23 except that it has a flat face 32 which is disposed opposite the head 30 to serve as a backing for the pin. The pin is driven into its orifices to a sufficient extent to permit the body 7'' to be assembled with the flat face 32 in engagement with the head 30. This construction provides a secure lock for the bushing which may be easily removed when occasion requires by driving it back into the chamber 4' after the body 7'' has been first removed.

The flat face 32 provides a space between it and the opposite adjacent portion of the wall of the chamber 4' for the transmission of lubricant to opposite sides of the collar 23', thereby obviating the necessity for the groove 25 of the embodiment shown in Fig. 3. The embodiment shown in Fig. 3 requires that the device be disposed in relation to the bushing 20 so that the chamber 4' will intercept the bushing in order to provide the groove 22. In the embodiment of Fig. 5 the chamber will be disposed sufficiently spaced from the bushing to prevent such interception.

While there have been hereinbefore described approved embodiments of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A mechanism comprising a member; a bushing mounted therein and carried thereby; a journal disposed in said bushing, said member and said bushing being adapted for rotative movement relative to said journal, a chamber for lubricant formed in said member having an opening at each of the opposite ends thereof, said member having a face adjacent each end opening forming a seat; a passageway for the emission of lubricant connecting said chamber with the inner face of said bushing; a closure body disposed in said chamber only partially filling said chamber to provide a space for the lubricant; means connecting said bushing with said body, said means holding said bushing against endwise movement relative to said member comprising a channel formed in the outer circumference of said bushing adjacent and opening into said chamber and a member extending from said body and engaging said channel; a head carried by said body at each end thereof closing the end opening adjacent thereto and having a face engaging the adjacent seat, at least one of said heads being adjustably secured to said body and adjusted to draw said heads into tight engagement with their respective seats; and a passageway connecting said chamber with the exterior providing means for supplying said chamber with lubricant.

2. A mechanism comprising a member; a bushing mounted therein and carried thereby; a journal disposed in said bushing, said member and said bushing being adapted for rotative movement relative to said journal; a chamber for lubricant formed in said member having an opening at each of the opposite ends thereof, said member having a face adjacent each end opening forming a seat; a passageway for the emission of lubricant connecting said chamber with the inner face of said bushing; a closure body disposed in said chamber only partially filling said chamber to provide a space for the lubricant; means connecting said bushing with said body, said means holding said bushing against endwise movement relative to said member comprising an arcuate channel formed in the outer circumference of said bushing adjacent and opening into said chamber, and a collar carried by said body and engaging said channel, said collar dividing said chamber into two portions; a passageway spanning said collar connecting said chamber portions; a head carried by said body at each end thereof closing the end opening adjacent thereto and having a face engaging the adjacent seat, at least one of said heads being adjustably secured to said body and adjusted to draw said heads into tight engagement with their respective seats; and a passageway connecting said chamber with the exterior providing means for supplying said chamber with lubricant.

3. A mechanism comprising two members adapted for relative movement therebetween; a bearing element disposed between said members, carried by one of said members and having a bearing face in engagement with the other of said members; a chamber for lubricant formed in said bearing-element-carrying member having an opening at each of the opposite ends thereof, said bearing-element-carrying member having a face adjacent each end opening forming a seat; a passageway for the emission of lubricant connecting said chamber with said bearing face; a closure body disposed in said chamber only partially filling said chamber to provide a space for the lubricant; means connecting said bearing element with said bearing-element-carrying member comprising an orifice extending from said chamber into said bearing element, a lock pin extending in said orifice from said chamber end thereof, and a member extending from said body and disposed opposite said pin to provide a backing therefor; a head carried by said body at each end thereof closing the end opening adjacent thereto and having a face engaging the adjacent seat, at least one of said heads being adjustably secured to said body and adjusted to draw said heads into tight engagement with their respective seats; and a passageway connecting said chamber with the exterior providing means for supplying said chamber with lubricant.

4. A mechanism comprising two members adapted for relative movement therebetween; a bearing element disposed between said members, carried by one of said members, and having a bearing face in engagement with the other of said members; a chamber for lubricant formed in said bearing-element-carrying member; a passageway for the emission of lubricant connecting said chamber with said bearing face; and means connecting said bearing element with said bearing-element-carrying member comprising an orifice extending from said chamber into said bearing element, a lock pin extending in said orifice from said chamber end thereof, and a member secured in said chamber disposed opposite said pin to provide a backing therefor.

5. A mechanism comprising an orificed member; a bushing disposed in said orifice and carried by said member; a journal disposed in said bushing, said member and bushing being adapted for unitary rotative movement relative to said journal; a chamber for lubricant formed in said member, having an opening at each of the opposite ends thereof, said member having a face adjacent each of said openings forming a seat; a passageway for the emission of lubricant connecting said chamber with the inner face of said bushing; a closure body disposed in said chamber only partially filling said chamber to provide a space for the lubricant; means connecting said bushing with said body, said means holding said bushing against movement relative to said member, and said body preventing movement of said means in a direction away from said bushing; a head carried by said body at each end thereof closing the end opening adjacent thereto and having a face engaging the adjacent seat, at least one of said heads being adjustably secured to said body and adjusted to draw said heads into tight engagement with their respective seats; and a passageway connecting said chamber with the exterior, providing means for supplying said chamber with lubricant.

6. A mechanism comprising an orificed member; a bushing disposed in said orifice and carried by said member; a journal disposed in said bushing, said member and bushing being adapted for unitary rotative movement relative to said journal; a chamber for lubricant formed in said member, having an opening at each of the opposite ends thereof, said member having a face adjacent each of said openings forming a seat; a passageway for the emission of lubricant connecting said chamber with the inner face of said bushing; a closure body disposed in said chamber only partially filling said chamber to provide a space for the lubricant; an orifice extending from said chamber into said bushing; a lock pin, disposed in said orifice, connecting said bushing with said member, and having an end portion disposed in said chamber in association with said body, whereby said body prevents movement of said lock pin away from said bushing; a head carried by said body at each end thereof closing the end opening adjacent thereto and having a face engaging the adjacent seat, at least one of said heads being adjustably secured to said body and adjusted to draw said heads into tight engagement with their respective seats; and a passageway connecting said chamber with the exterior providing means for supplying said chamber with lubricant.

7. A mechanism comprising an orificed member; a bushing disposed in said orifice and carried by said member; a journal disposed in said bushing, said member and bushing being adapted for unitary rotative movement relative to said journal; a chamber for lubricant formed in said member; means closing each end of said chamber; a passageway for the emission of lubricant connecting said chamber with the inner face of said bushing; a body disposed in said chamber, and secured therein against movement transversely of said chamber, only partially filling said chamber to provide a space for the lubricant; a recess opening into said chamber and extending into said bushing; locking means, disposed in said recess, holding said bushing against movement relative to said member, said locking means being held by said body against displacement movement relative to said bushing; and a passageway connecting said chamber with the exterior providing means for supplying said chamber with lubricant.

8. A mechanism comprising an orificed member; a bushing disposed in said orifice and carried by said member; a journal disposed in said bushing, said member and bushing being adapted for unitary rotative movement relative to said journal; a chamber for lubricant formed in said member, intercepting said orifice, a portion of said bushing conformed to form a portion of said chamber at said interception; means closing each end of said chamber; a passageway for the emission of lubricant connecting said chamber with the inner face of said bushing; means disposed in said chamber, and secured therein against movement transversely of said chamber, only partially filling said chamber to provide a space for the lubricant, a portion of said last mentioned means engaging the chamber-forming-portion of said bushing, holding said bushing against movement relative to said member; and a passageway connecting said chamber with the exterior providing means for supplying said chamber with lubricant.

9. A mechanism comprising an orificed power transmission rod; a crank pin disposed in said orifice; a bushing disposed between said rod and said pin for rotative movement relative to said pin; a cylindrical chamber for lubricant formed in said rod with its axis at right angles to the axis of said pin, having an opening at each of the opposite ends thereof, said rod having a face adjacent each of said openings forming a seat; a passageway for the emission of lubricant leading from said chamber to a bearing face of said bushing; a closure body disposed in said chamber only partially filling said chamber to provide a space for the lubricant; a head carried by said body at each end thereof closing the end opening adjacent thereto and having a face engaging the adjacent seat, at least one of said heads being adjustably secured to said body and adjusted to draw said heads into tight engagement with their respective seats; a passageway connecting said chamber with the exterior, providing means for supplying said chamber with lubricant; and means extending from said chamber into said bushing, holding said bushing against endwise movement relative to said rod, said means being backed by said body to prevent displacement movement of said means out of bushing-holding position.

10. A mechanism comprising an orificed power transmission rod; a crank pin disposed in said orifice; a bushing disposed between said rod and said pin; a cylindrical chamber for lubricant formed in said rod with its axis at right angles to the axis of said pin, having an opening at each of the opposite ends thereof, said rod having a face adjacent each of said openings forming a seat; a passageway for the emission of lubricant leading from said chamber to a bearing face of said bushing; a closure body disposed in said chamber only partially filling said chamber to provide a space for the lubricant, threaded externally at an end thereof adjacent one of said openings; a closure carried by said body at the opposite end thereof closing the end opening adjacent thereto and having a face engaging the adjacent seat; an adjustable closure closing the end opening adjacent said threaded end of said body and having a face engaging the adjacent seat, said adjustable closure being provided with an opening extending from its inner end to its outer end, the inner end portion of said closure opening being of larger diameter than the outer end portion and provided with threads engaging said external threads of said body and adjusted thereby to draw said closures into sealing engagement with their respective seats, said opening portion of larger diameter extending beyond the adjacent end of said body to provide a space, said body having a passageway connecting said closure space with said chamber; and a lubricant fitting secured in said outer portion of said closure opening for introducing lubricant into said closure space.

OTTO JABELMANN.
RAYMOND J. FINCH.